United States Patent
Johnson (10) Patent No.: US 8,906,237 B2
(45) Date of Patent: Dec. 9, 2014

(54) WATER TREATMENT AND REUSE SYSTEM

(76) Inventor: Curt Johnson, Casper, WY (US)

( * ) Notice: Subject to any disclaimer, the term of this patent is extended or adjusted under 35 U.S.C. 154(b) by 383 days.

(21) Appl. No.: 12/796,523

(22) Filed: Jun. 8, 2010

(65) Prior Publication Data

US 2010/0307975 A1     Dec. 9, 2010

Related U.S. Application Data

(60) Provisional application No. 61/185,477, filed on Jun. 9, 2009, provisional application No. 61/185,504, filed on Jun. 9, 2009, provisional application No. 61/185,497, filed on Jun. 9, 2009.

(51) Int. Cl.
| | |
|---|---|
| *B01D 61/00* | (2006.01) |
| *B01D 1/00* | (2006.01) |
| *C02F 1/00* | (2006.01) |
| *C02F 1/44* | (2006.01) |
| *C02F 1/48* | (2006.01) |
| *B01D 63/00* | (2006.01) |
| *C02F 9/00* | (2006.01) |
| *B01D 17/12* | (2006.01) |
| *C07C 1/00* | (2006.01) |
| *C02F 1/40* | (2006.01) |
| *C02F 1/463* | (2006.01) |
| *C02F 11/12* | (2006.01) |
| *C02F 101/32* | (2006.01) |
| *C02F 103/36* | (2006.01) |

(52) U.S. Cl.
CPC . *C02F 9/00* (2013.01); *C02F 1/001* (2013.01); *C02F 1/40* (2013.01); *C02F 1/441* (2013.01); *C02F 1/463* (2013.01); *C02F 11/121* (2013.01); *C02F 2001/007* (2013.01); *C02F 2101/32* (2013.01); *C02F 2103/365* (2013.01)
USPC .......... 210/650; 210/703; 210/767; 210/259; 210/748.01; 210/805; 204/157.15; 204/158.2

(58) Field of Classification Search
CPC ........ B01D 61/00; B01D 23/00; B01D 63/02; C02F 9/06; C02F 1/463; C02F 1/441
USPC ......... 210/703, 652, 651, 767, 259, 650, 805, 210/748.01; 204/660, 158.2, 554, 671, 662, 204/666, 240, 238, 157.15; 205/751
See application file for complete search history.

(56) References Cited

U.S. PATENT DOCUMENTS

| | | |
|---|---|---|
| 4,482,459 A | 11/1984 | Shiver |
| 5,484,536 A * | 1/1996 | Yamaguchi et al. .......... 210/741 |

(Continued)

FOREIGN PATENT DOCUMENTS

| | | | |
|---|---|---|---|
| ES | 2259870 A1 | | 10/2006 |
| WO | WO03057631 A1 | | 7/2003 |
| WO | WO 2010/144582 | * | 6/2010 |

OTHER PUBLICATIONS

Hal Alper, Removal of oils and rganic compounds from water and air with MYCELX HRM (Hydrocarbon Removal matrix) Tehnology; Yr 2000, Control Masters, Inc.*

(Continued)

*Primary Examiner* — Ana Fortuna
(74) *Attorney, Agent, or Firm* — Duft Bornsen & Fettig, LLP (57) ABSTRACT

System and methods are disclosed for filtering wastewater. In one embodiment, a water filtering system comprises a first filtering stage and a second filtering stage. The first filtering stage receives a flow of wastewater, and uses electrocoagulation to separate suspended particles from the wastewater and produce filtered wastewater. The second filtering stage receives the filtered wastewater from the first filtering stage, and uses mechanical filtering to remove suspended particles from the filtered wastewater and produce filtered water that is substantially free from suspended particles.

13 Claims, 7 Drawing Sheets

(56) References Cited

U.S. PATENT DOCUMENTS

| | | | |
|---|---|---|---|
| 5,569,384 A * | 10/1996 | Saatweber et al. | 210/651 |
| 5,837,146 A * | 11/1998 | Alper | 210/728 |
| 5,885,453 A * | 3/1999 | Chatelin et al. | 210/321.75 |
| 6,461,525 B2 * | 10/2002 | Ellard et al. | 210/797 |
| 6,663,783 B2 | 12/2003 | Stephenson et al. | 204/242 |
| 6,689,271 B2 * | 2/2004 | Morkovsky et al. | 205/757 |
| 6,719,894 B2 * | 4/2004 | Gavrel et al. | 205/744 |
| 6,820,419 B2 * | 11/2004 | Ford et al. | 60/310 |
| D506,807 S | 6/2005 | Johnson et al. | |
| D508,107 S | 8/2005 | Johnson et al. | |
| D520,103 S | 5/2006 | Johnson et al. | |
| D520,595 S | 5/2006 | Johnson et al. | |
| D520,596 S | 5/2006 | Johnson et al. | |
| D525,678 S | 7/2006 | Johnson et al. | |
| D526,385 S | 8/2006 | Johnson et al. | |
| 7,087,176 B2 * | 8/2006 | Gavrel et al. | 204/571 |
| D541,370 S | 4/2007 | Johnson et al. | |
| 7,258,800 B1 | 8/2007 | Herbst | |
| 7,291,267 B2 | 11/2007 | Johnson et al. | |
| 7,459,091 B2 | 12/2008 | Johnson et al. | |
| 7,459,092 B2 | 12/2008 | Johnson et al. | |
| 7,731,854 B1 | 6/2010 | Herbst | |
| 7,906,023 B2 | 3/2011 | Johnson et al. | |
| 8,012,355 B2 | 9/2011 | Johnson et al. | |
| 8,119,008 B2 * | 2/2012 | Heiss | 210/652 |
| 2002/0020631 A1 * | 2/2002 | Gavrel et al. | 205/752 |
| 2003/0121253 A1 * | 7/2003 | Ford et al. | 60/310 |
| 2004/0060876 A1 * | 4/2004 | Tipton | 210/748 |
| 2004/0140218 A1 * | 7/2004 | Gavrel et al. | 204/660 |
| 2004/0192533 A1 | 9/2004 | Collier | |
| 2006/0021942 A1 * | 2/2006 | Bradley | 210/663 |
| 2008/0116145 A1 | 5/2008 | Johnson et al. | |
| 2008/0226782 A1 * | 9/2008 | Phillips et al. | 426/332 |
| 2009/0045126 A1 | 2/2009 | Johnson et al. | |
| 2009/0107915 A1 * | 4/2009 | Skinner et al. | 210/636 |
| 2009/0166296 A1 * | 7/2009 | Tigani et al. | 210/716 |
| 2010/0116686 A1 * | 5/2010 | Wiemers et al. | 205/742 |
| 2010/0140180 A1 * | 6/2010 | Powell | 210/710 |
| 2010/0307975 A1 * | 12/2010 | Johnson | 210/652 |
| 2011/0000790 A1 * | 1/2011 | Wood et al. | 204/553 |
| 2011/0163017 A1 | 7/2011 | Johnson et al. | |
| 2011/0192730 A1 * | 8/2011 | Bjornen | 205/742 |
| 2011/0240010 A1 * | 10/2011 | Van Esch et al. | 127/71 |
| 2012/0085650 A1 * | 4/2012 | Hartle | 204/554 |
| 2012/0145647 A1 * | 6/2012 | Volkel et al. | 210/738 |
| 2012/0211432 A1 * | 8/2012 | Lean et al. | 210/715 |

OTHER PUBLICATIONS

Micelx Technologies Corporation; Micelx Patented Polymeric Surfactant Technology: Filter Cartridges for Single Pass Hydrocarbon Removal and Oil Spill Remediation used in Industries Bilge Waste Water, Pollutant Removal, Marine and Stornwater Filtratioon (Non-dated).*

US Department of Energy; Custom WAter Solutions: Water Filtering Test; Jun. 15-17, 2009, pp. 1-34.*

Ruijun and Thomas Ramsey; Kaydon filtration Corp. LaGrange, GA 30240, USA, Parafil, Inc. GA 30340, USA, undated.*

* cited by examiner

WATER TREATMENT AND REUSE SYSTEM

RELATED APPLICATIONS

This non-provisional application claims priority to U.S. provisional applications 61/185,477, 61/185,504, and 61/185,497, each of which were filed on Jun. 9, 2009. These provisional applications are incorporated by reference as if fully provided herein.

FIELD OF THE INVENTION

The invention relates to the field of water treatment systems, and more particularly, to systems and methods for filtering wastewater.

BACKGROUND

Oil production industries are consistently forced to deal with water challenges that result from drilling processes. During a drilling process, an oil/water mixture is pumped from the ground, which is referred to as production water or wastewater. The wastewater coming from the ground could be 95% water and 5% oil by volume. The wastewater may also include traces of heavy metals and other contaminants. Before the wastewater can be safely disposed of or reused, the contaminants need to be removed. Thus, oil companies have the challenge of removing contaminants and safely disposing of the wastewater. Other companies in other industries face similar problems of having to safely dispose of wastewater.

One common way of treating wastewater is through a reverse osmosis filtering process. Unfortunately, the reverse osmosis filtering process is expensive and can be relatively slow especially when the oil content in the wastewater is high. Another common way of treating the wastewater is through a distillation process. Again, the distillation process is expensive and time consuming. Yet another way of treating the wastewater is through a chemical processes. The chemical processes are again expensive, and further processes are needed to return the wastewater to a safe level.

Thus, there is a need in the art for improved filtering systems so that wastewater can be safely and reliably processed.

SUMMARY

Embodiments described herein provide improved systems for filtering wastewater. The filtering systems include a first filtering stage that uses electrocoagulation (EC) to separate suspended particles from the wastewater. The filtering systems also include a second filtering stage that uses mechanical filtering to remove suspended particles that remain to produce filtered water that is free or substantially free from suspended particles. This multi-stage filtering process effectively filters wastewater in a cost-effective manner while allowing for high through-put levels.

One embodiment comprises a water filtering system comprising a first filtering stage and a second filtering stage. The first filtering stage receives a flow of wastewater, and uses electrocoagulation to separate suspended particles from the wastewater and produce filtered wastewater. The second filtering stage receives the filtered wastewater from the first filtering stage, and uses mechanical filtering to remove suspended particles from the filtered wastewater and produce filtered water that is free or substantially free from suspended particles.

In another embodiment, the water filtering system includes a third filtering stage that receives the filtered water from the second filtering stage, and removes dissolved particles from the filtered water to produce filtered water that is free or substantially free from dissolved particles.

In another embodiment, the water filtering system includes a pre-filtering stage that removes hydrocarbons from the flow of wastewater before the wastewater is fed to the first filtering stage.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
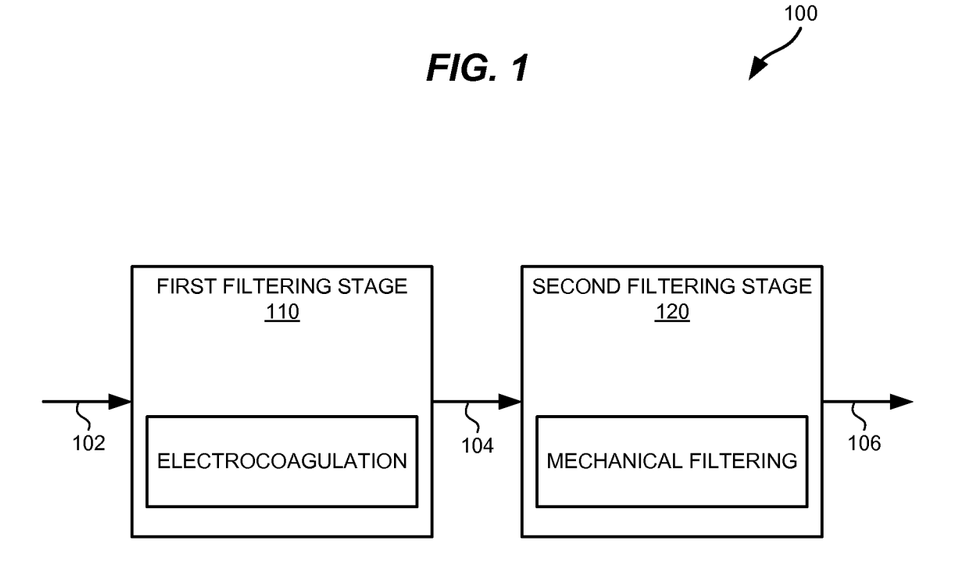
FIG. 1 illustrates a water filtering system in an exemplary embodiment.

FIG. 1 illustrates a water filtering system 100 in an exemplary embodiment. Water filtering system 100 includes multiple stages for filtering wastewater (also referred to as production water). One example of the wastewater is produced during oil drilling processes. Water filtering system 100 includes a first filtering stage 110 and a second filtering stage 120. A filtering stage refers to a phase or part of an overall filtering process where one or more systems operate to filter wastewater.

When in operation, first filtering stage 110 receives a flow of wastewater 102. First filtering stage 110 uses electrocoagulation (EC) to separate suspended particles from the wastewater 102 and produce filtered wastewater 104. Second filtering stage 120 receives the filtered wastewater 104 from first filtering stage 110. Second filtering stage 120 uses mechanical filtering (e.g., one or more mechanical filters) to separate out or remove suspended particles from the filtered wastewater 104 that may remain, and produce filtered water 106 that is free or substantially free from suspended particles. The filtered water 106 may still have some suspended particles, but the number of particles (in parts per million) have been reduced to a level that is considered safe for disposal or reuse. This multi-stage filtering process removes polymers, paraffin, heavy metals, or other contaminating particles from the wastewater 102, which results in water that may be disposed of or reused safely.

Figure 2:
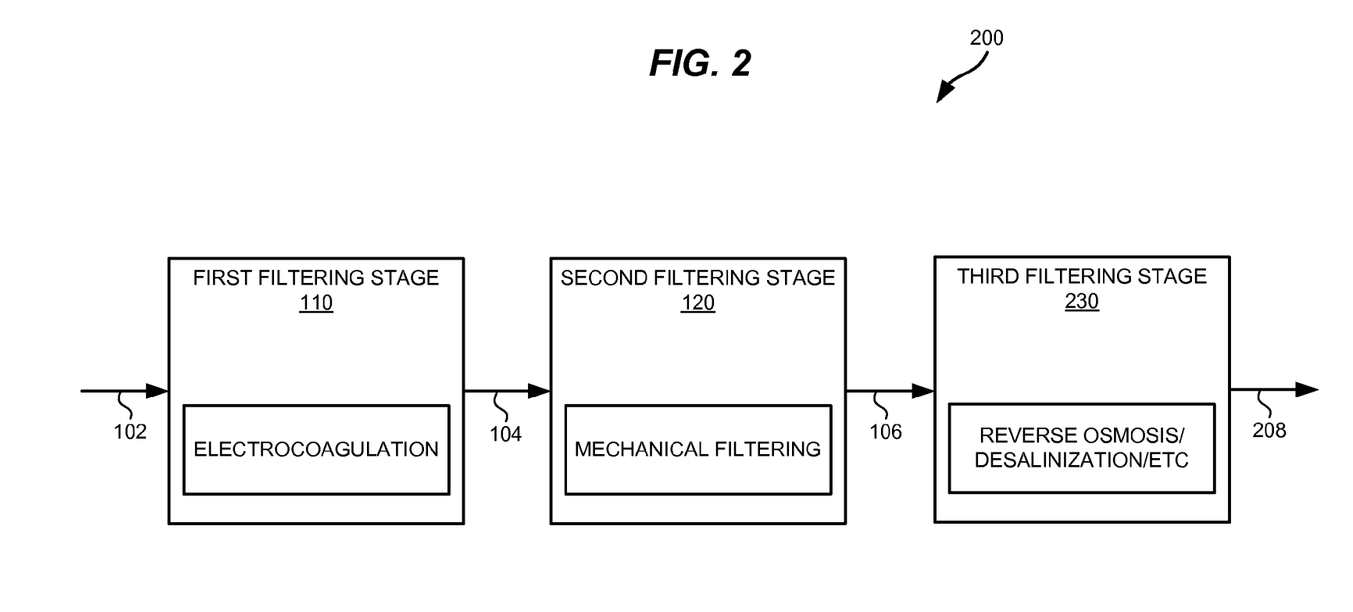
FIG. 2 illustrates another water filtering system in an exemplary embodiment.

FIG. 2 illustrates another water filtering system 200 in an exemplary embodiment. Water filtering system 200 is similar to the system 100 in FIG. 1, but additionally includes a third filtering stage 230. Third filtering stage 230 receives the filtered water 106 from second filtering stage 120. Third filtering stage 230 then separates out or removes dissolved particles from the filtered water 106 of second filtering stage 120 to produce filtered water 208 that is free or substantially free from dissolved particles. Third filtering stage 230 may comprise a reverse osmosis system, a desalinization system, or another type of filtering system. The filtered water 208 may still have some dissolved particles, but the number of particles (in parts per million) have been reduced to a level that is considered safe for reuse or disposal.

Figure 3:
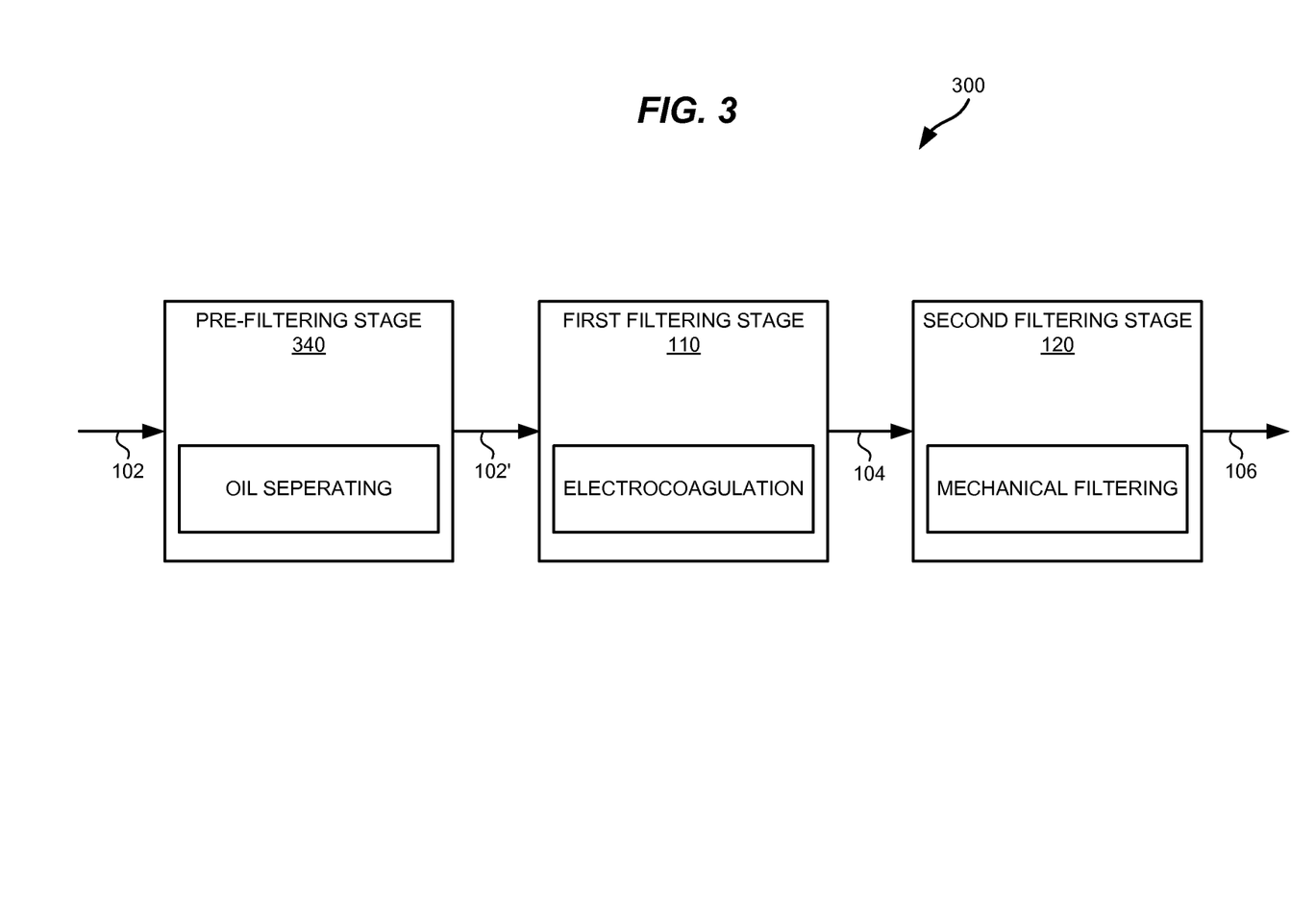
FIG. 3 illustrates yet another water filtering system in an exemplary embodiment.

FIG. 3 illustrates yet another water filtering system 300 in an exemplary embodiment. Water filtering system 300 is similar to the system 100 in FIG. 1, but additionally includes a pre-filtering stage 340. Pre-filtering stage 340 receives the flow of wastewater 102 before the wastewater 102 reaches first filtering stage 110. Pre-filtering stage 340 operates to separate out or remove oil and other hydrocarbons from the wastewater 102 to produce wastewater 102' that is substantially free from hydrocarbons. Pre-filtering stage 340 may include an oil separator, an oil skimmer, a MyCelx® filter, and/or other types of filters. A MyCelx® filter is a filter manufactured by MyCelx Technologies Corporation (Duluth, Ga.). A MyCelx® filter includes a spunbond polypropylene, replaceable filter cartridge that is coated with an oil absorptive material to remove oil or light hydrocarbons. The flow of wastewater 102' is then fed to first filtering stage 110.

Although not shown in FIG. 3, third filtering stage 230 as shown in FIG. 2 may be implemented along with pre-filtering stage 340 as shown in FIG. 3. Also, although oil separation is shown in pre-filtering stage 340, the process of oil separation may be performed after first filtering stage 110 or after second filtering stage 120.

Figure 4:
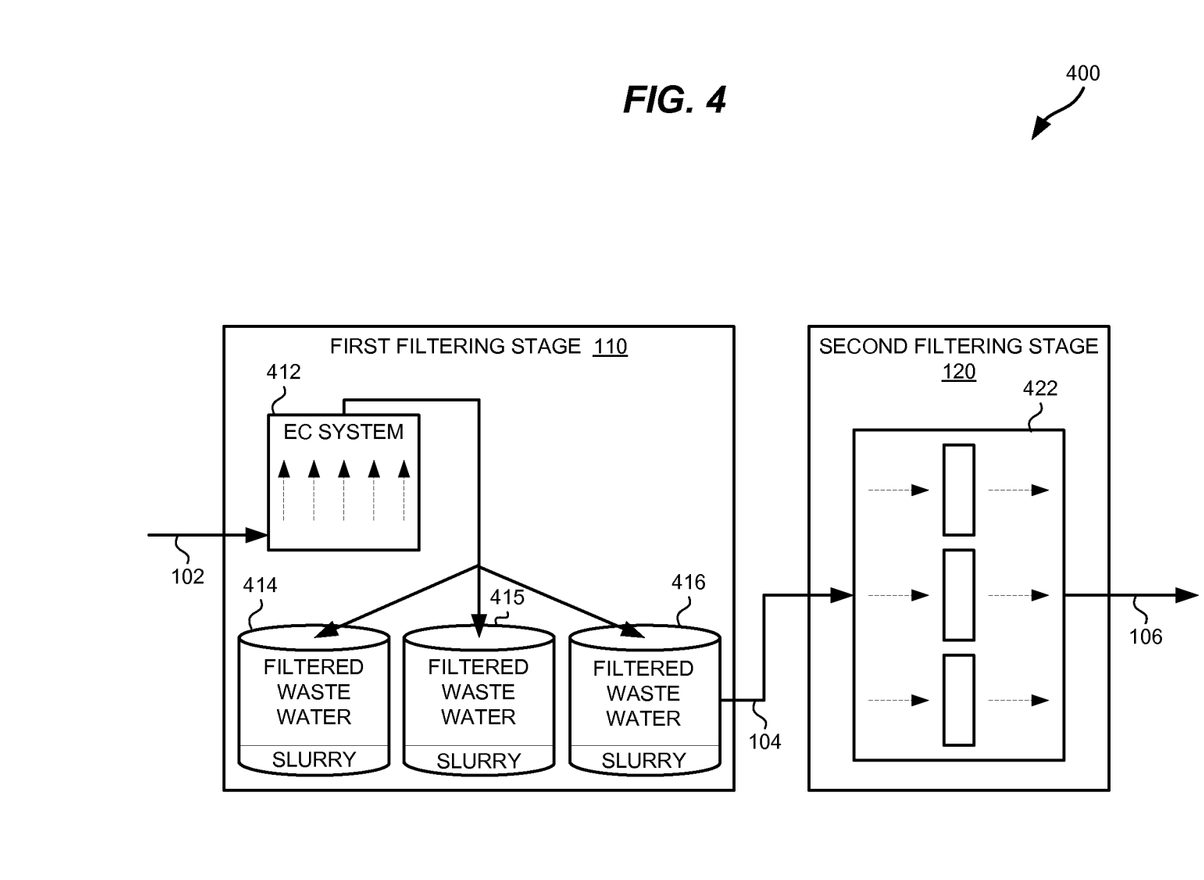
FIG. 4 illustrates one exemplary implementation of the water filtering system shown in FIG. 1.

FIG. 4 illustrates one exemplary implementation of the water filtering system 100 shown in FIG. 1. Water filtering system 100 may be configured in a different manner in other embodiments, as this is just one example. In this embodiment, first filtering stage 110 includes an electrocoagulation (EC) system 412 connected to a plurality of settling tanks 414-416. EC system 412 comprises any system that uses electrocoagulation to separate suspended particles from a liquid. One example of EC system 412 is a system produced by Powell Water Systems, Inc. Settling tanks 414-416 comprise any type of tank that is able to store water. Tanks 414-416 are referred to as settling tanks because as the wastewater sits in the tank after the electrocoagulation process, particles in the wastewater release from the liquid and settle to the bottom of the tank. Any desired type, size, and number of tanks may be used for settling tanks 414-416.

When in operation, EC system 412 receives the flow of wastewater 102. As illustrated by the arrows in FIG. 4, the wastewater 102 flows up through the EC system 412 and out of its top. EC system 412 includes pairs of conductive metal plates, which act as sacrificial electrodes (one as an anode and one as a cathode). As the wastewater 102 flows through EC system 412, a potential is placed across the electrodes which injects a current through the wastewater 102. The positive side undergoes anodic reactions while the negative side undergoes cathodic reactions. Consumable metal plates, such as iron or aluminum, are usually used as sacrificial electrodes to continuously produce ions in the wastewater 102. Ions (e.g., heavy metals) and colloids (organic and inorganic) are mostly held in the wastewater 102 by electrical charges. The released ions neutralize the charges on the particles in the wastewater 102 and thereby initiate coagulation. As a result, the reactive and excited state causes the contaminant particles to be released from the wastewater 102.

The wastewater 102 from EC system 412 is gravity-fed to settling tanks 414-416 where the wastewater 102 is temporarily stored. As the wastewater 102 sits in settling tanks 414-416, the neutralized particles in the wastewater 102 separate from the wastewater 102 and fall to the bottom of settling tanks 414-416. The particles that are released from the wastewater 102 form a slurry of solids on the bottom of settling tanks 414-416, while the filtered water 104 remains as a liquid on top of the slurry.

Settling tanks 414-416 may be filled one at a time. For example, after settling tank 414 has been filled, wastewater 102 from EC system 412 may be fed to settling tank 415 while the wastewater 102 in settling tank 414 is allowed to sit. Similarly, after settling tank 415 has been filled, wastewater 102 from EC system 412 may be fed to settling tank 416 while the wastewater 102 in settling tanks 414-415 is allowed to sit. When settling tank 416 is being filled or about to be filled, the filtered wastewater 104 from settling tank 414 may be fed to second filtered stage 120 so that the liquid in setting tank 414 is emptied. When settling tank 414 is emptied, the filtered wastewater 104 from settling tank 415 may be fed to second filtered stage 120 so that the liquid in setting tank 415 is emptied. Settling tanks 414-416 may be used in this manner to receive wastewater 102 from EC system 412 and feed filtered wastewater 104 to second filtering stage 120.

In another embodiment, settling tanks 414-416 may be connected in series so that filtered wastewater 104 from settling tank 414 may be fed to settling tank 415 where particles may be allowed to further separate from the wastewater 102. Filtered wastewater 104 from settling tank 415 may be fed to settling tank 416 where particles may again be allowed to further separate from the wastewater 102. The filtered wastewater 104 from settling tank 416 may then be fed to second filtered stage 120.

The filtered wastewater 104 sitting in one or more of settling tanks 414-416 is subsequently fed to second filtering stage 120. Second filtering stage 120 includes one or more mechanical filters 422. For example, mechanical filters 422 may comprise multiple filters having a desired pore size for the particles to be filtered, such as a 0.5 micron pore size, a 0.1 micron pore size, etc. Alternatively, mechanical filters 422 may comprise step-down filters where each successive filter in series has a smaller pore size. Within second filtering stage 120, the filtered wastewater 104 is passed through mechanical filters 422 and produces filtered water 106 that is free or substantially free from suspended particles. The filtered water 106 may still have some suspended particles, but the number of particles (in parts per million) have been reduced to a level that is considered safe for reuse or disposal.

Figure 5:
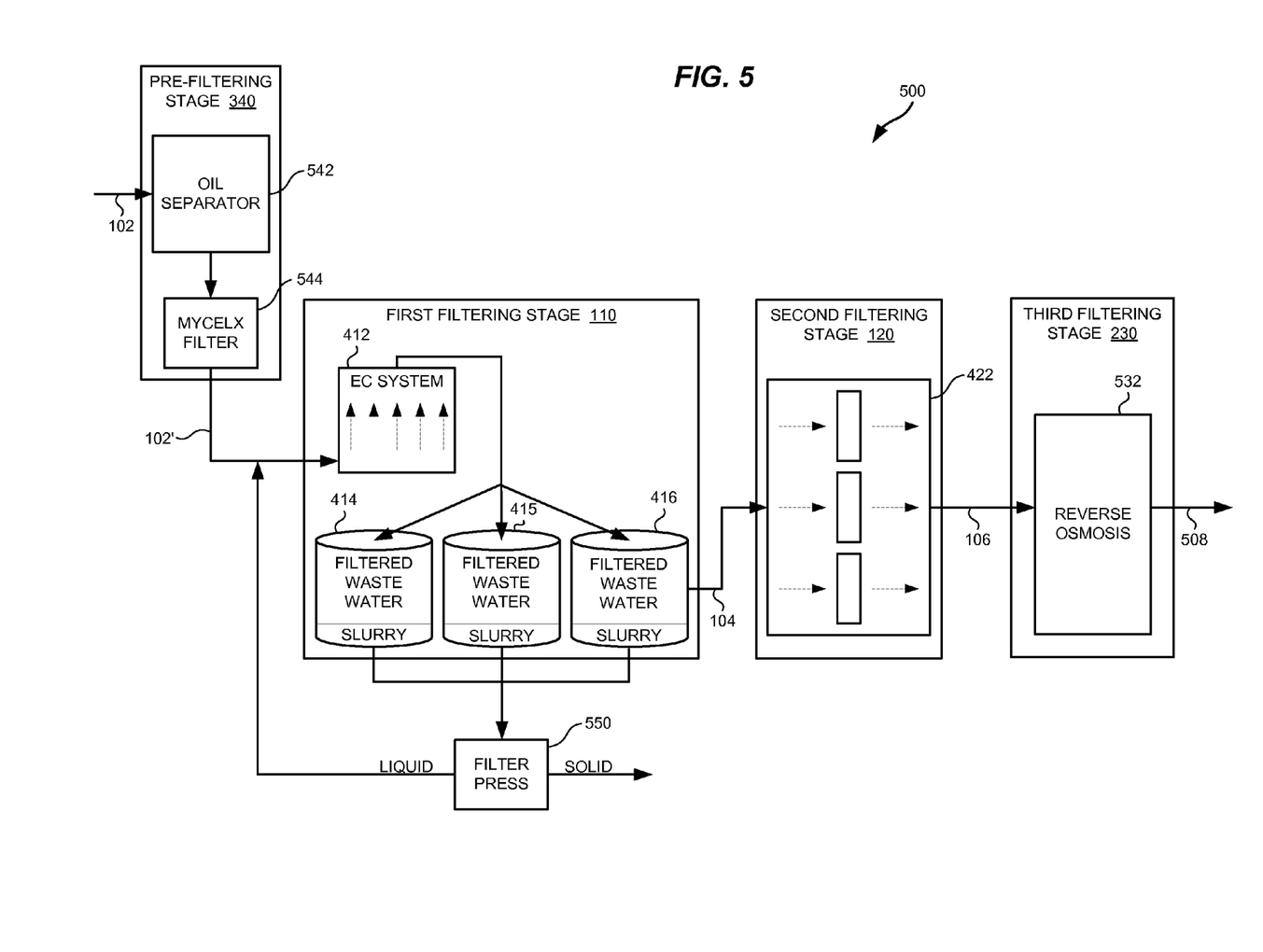
FIG. 5 illustrates a detailed exemplary implementation of a water filtering system.

FIG. 5 illustrates a detailed exemplary implementation of a water filtering system 500. The scope of the invention is not limited to this embodiment, as the detail provided in the filtering stages in this embodiment is for the purpose of example. Water filtering system 500 includes first filtering stage 110 and second filtering stage 120 as illustrated in FIG. 4. In addition to the first and second filtering stages 110 and 120, water filtering system 500 includes third filtering stage 230, pre-filtering stage 340, and a filter press 550. In this embodiment, third filtering stage 230 includes a reverse osmosis (RO) filter 532. Pre-filtering stage 340 includes an oil separator 542 and one or more MyCelx® filters 544. Oil separator 542 may comprise a flow-through separator or an oil skimmer.

When in operation, the wastewater 102 is first passed through pre-filtering stage 340. Thus, the flow of wastewater 102 enters oil separator 542 where oil separator 542 operates to remove oil and other hydrocarbons from the wastewater 102. The wastewater 102 is then passed through one or more MyCelx® filters 544, which acts to remove remaining hydrocarbons from the wastewater 102 that was not removed by oil separator 542. The flow of wastewater 102' that leaves pre-filtering stage 340 should thus be free or substantially free of oil and other hydrocarbons.

The flow of wastewater 102' then enters first filtering stage 110 where EC system 412 receives the flow of wastewater 102'. As the wastewater 102' flows up through EC system 412 and out its top, EC system 412 neutralizes the charges of the particles in the wastewater 102' through electrolysis. The wastewater 102' from EC system 412 is gravity-fed to settling tanks 414-416 where the wastewater 102' is temporarily stored. As the wastewater 102' sits in settling tanks 414-416, the neutralized particles in the wastewater 102' separate from the wastewater 102' and fall to the bottom of settling tanks 414-416. The particles that are released from the wastewater form a slurry on the bottom of settling tanks 414-416, while the filtered water 104 remains on top of the slurry.

The filtered wastewater 104 sitting in settling tanks 414-416 is subsequently fed to second filtering stage 120. Within second filtering stage 120, the filtered wastewater 104 is passed through one or more mechanical filters 422. In this example, the filtered wastewater 104 is passed through mechanical filters 422 having a 0.1 micron pore size. Mechanical filters 422 remove particles that are still suspended within the filtered wastewater 104 to produce filtered water 106 that is free or substantially free from suspended particles.

The filtered water 106 from second filtering stage 120 is subsequently fed to third filtering stage 230. Within third filtering stage 230, the filtered water 106 is passed through reverse osmosis filter 532. Reverse osmosis filter 532 acts to remove particles that are dissolved in the filtered water 106 and produce filtered water 508 that is free or substantially free from dissolved particles. For example, reverse osmosis filter 532 may remove sodium, chlorides, or other particles that are dissolved in the filtered water 106. The filtered water 508, at this point, should be considered safe for disposal or reuse.

The slurry that forms on the bottom of settling tanks 414-416 is also processed by water filtering system 500 in the following way. As is illustrated in FIG. 5, the filtered wastewater 102' that is fed into settling tanks 414-416 separates into a liquid and a slurry as the neutralized particles fall to the bottom of settling tanks 414-416. The liquid stored in settling tanks 414-416 is the filtered wastewater 104 that is fed to second filtering stage 120. The slurry is fed from the bottom of settling tanks 414-416 to filter press 550. Filter press 550 squeezes the remaining liquid out of the slurry. The liquid that is squeezed out of the slurry is fed back to EC system 412 of first filtering stage 110 to be processed again. The solid material remaining from filter press 550 may be disposed of in any desired manner, such as a landfill.

Water filtering system 500 as described above advantageously produces clean water (filtered water 508) that may be disposed of safely by simply dumping it onto the ground or into a water system, such as a pond. The filtered water 508 may also be reused in some manner because most or all of the contaminants in the water have been removed. Not only is water filtering system 500 effective in removing contaminants, it can reach through-puts of 1000 gallons per minute, 2000 gallons per minute, or more which allows system 500 to filter large quantities of wastewater. Also, the cost of filtering the wastewater using system 500 is lower than other filtering methods.

Figure 6:
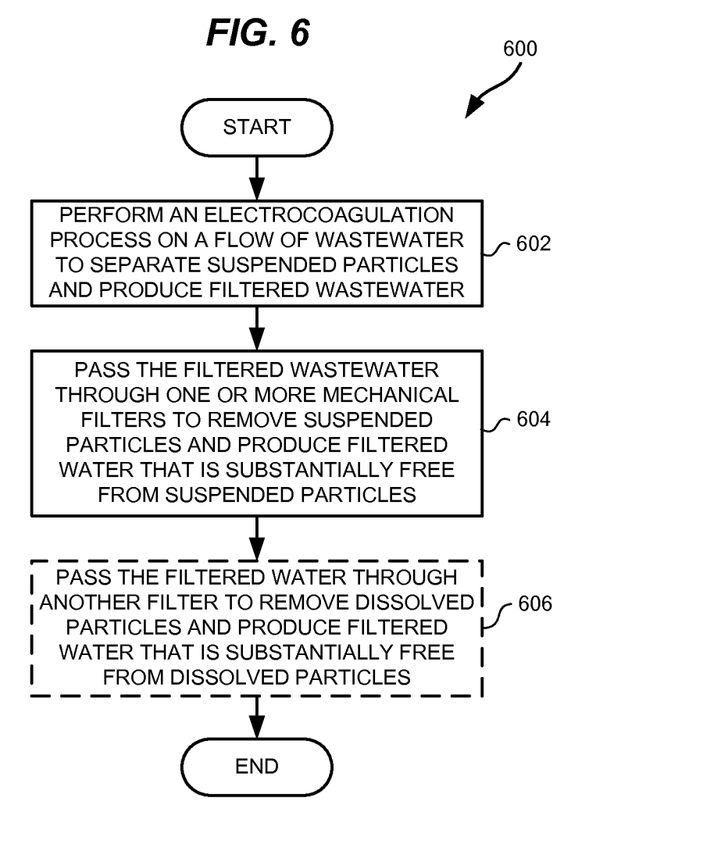
FIG. 6 is a flow chart illustrating a method of filtering wastewater in an exemplary embodiment.
Figure 7:
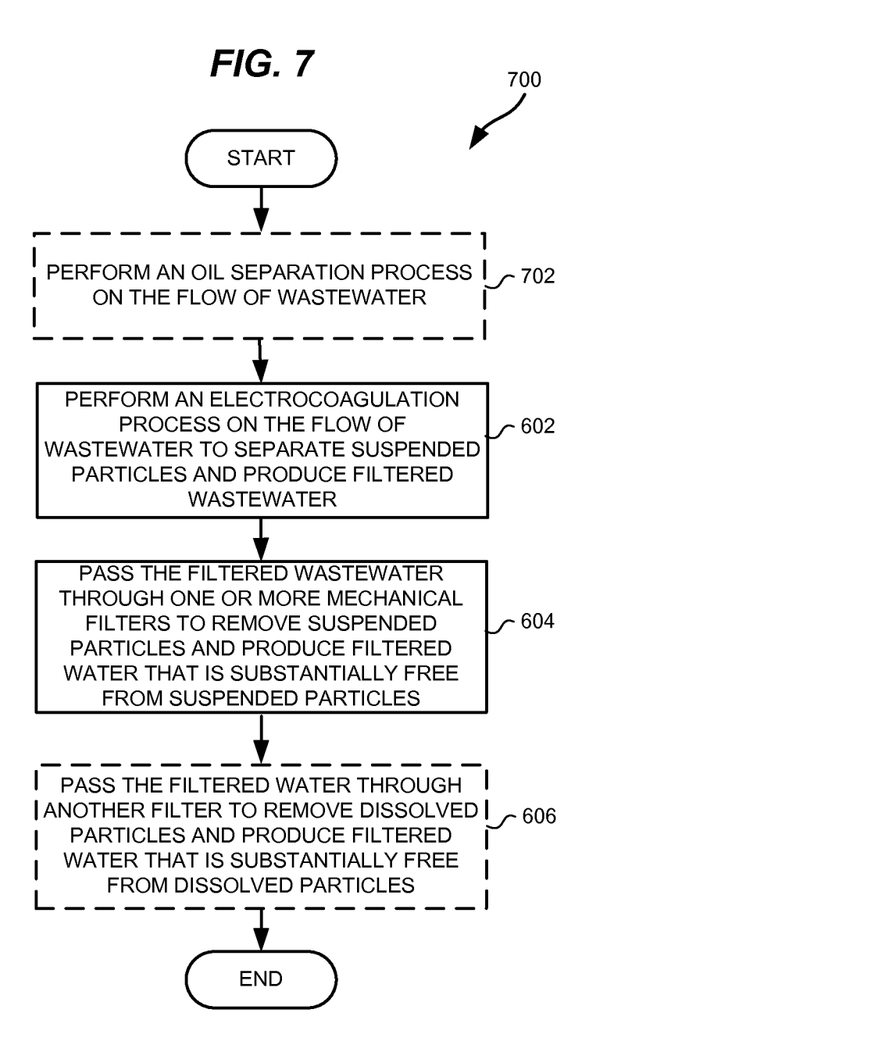
FIG. 7 is a flow chart illustrating another method of filtering wastewater in an exemplary embodiment.

In addition to the systems above, embodiments herein may be described as methods of filtering wastewater. FIGS. 6-7 illustrate some of the filtering methods provided herein.

FIG. 6 is a flow chart illustrating a method 600 of filtering wastewater in an exemplary embodiment. The steps of method 600 may be performed in the systems described above. The steps of the flow charts described herein are not all inclusive and may include other steps not shown.

In step 602, an electrocoagulation (EC) process is performed on a flow of wastewater to separate suspended particles from the wastewater to produce filtered wastewater. The EC process may include passing the wastewater through an EC system to neutralize the charges of the particles in the wastewater. The EC process may further include feeding (such as by using gravity) the wastewater from the EC system to one or more settling tanks where the wastewater is temporarily stored. As the wastewater sits in the settling tanks, the neutralized particles in the wastewater separate from the wastewater and fall to the bottom of the settling tanks. The particles that are released from the wastewater form a slurry on the bottom of the settling tanks, while the filtered wastewater remains on top of the slurry.

In step 604, the filtered wastewater from step 602 is passed through one or more mechanical filters to separate out or remove suspended particles from the filtered wastewater and produce filtered water that is free or substantially free from suspended particles. The mechanical filters may have any desired pore size, such as 0.1 microns.

Step 606 is an optional step that may be performed on the filtered water produced in step 604. Step 606 comprises passing the filtered water through a reverse osmosis filter or another type of filter to remove dissolved particles from the filtered water and produce filtered water that is free or substantially free from dissolved particles.

FIG. 7 is a flow chart illustrating another method 700 of filtering wastewater in an exemplary embodiment. The embodiment in FIG. 7 is similar to the one shown in FIG. 6, but includes an optional pre-filtering step. Thus, before the wastewater is processed using electrocoagulation, an oil separation process is performed on the flow of wastewater to separate out or remove oil or other hydrocarbons from the wastewater in step 702. The oil separation process may include passing the wastewater through an oil separator or an oil skimmer and/or passing the wastewater through one or more MyCelx® filters. After the oil separation process, the EC process in step 602 may be performed on the wastewater that is free or substantially free from hydrocarbons.

Although not specifically spelled out, additional details of the methods of filtering wastewater may be gleaned from the description above regarding the filtering systems.

Although specific embodiments were described herein, the scope of the invention is not limited to those specific embodiments. The scope of the invention is defined by the following claims and any equivalents thereof.

I claim:
1. A water filtering system, comprising:
a pre-filtering stage, including an oil separator and at least one filter having a spunbond polypropylene, replaceable filter cartridge that is coated with an oil absorptive material sold as MyCelx®, that receives a flow of wastewater, and removes hydrocarbons from the wastewater;

a first filtering stage including:
  an electrocoagulation system that receives the flow of wastewater, and neutralizes charges on the suspended particles in the wastewater as the wastewater flows up through the electrocoagulation system and out its top; and
  at least one settling tank that receives the wastewater from the electrocoagulation system, and temporarily stores the wastewater to allow the suspended particles having the neutralized charges to separate from the wastewater and fall to the bottom of the at least one settling tank, wherein the wastewater is gravity-fed from the electrocoagulation system to the at least one settling tank; and
a second filtering stage that receives the filtered wastewater from the at least one settling tank, and uses at least one mechanical filter to remove suspended particles from the filtered wastewater and produce filtered water that is free from suspended particles.

2. The water filtering system of claim 1 wherein:
the at least one mechanical filter has a pore size down to 0.5 microns.

3. The water filtering system of claim 1 further comprising:
a third filtering stage that receives the filtered water from the second filtering stage, and removes dissolved particles from the filtered water to produce filtered water that is substantially free from dissolved particles.

4. The water filtering system of claim 3 wherein:
the third filtering stage uses reverse osmosis to remove the dissolved particles from the filtered water.

5. The water filtering system of claim 1 further comprising:
a filter press connected to the at least one settling tank;
wherein the filter press receives a slurry from the bottom of the at least one settling tank, and separates the slurry into a solid and a liquid,
wherein the liquid removed from the slurry is fed back to the electrocoagulation system.

6. A method of filtering wastewater, the method comprising:
  receiving a flow of wastewater;
  passing the wastewater through an oil separator and at least one filter having a spunbond polypropylene, replaceable filter cartridge that is coated with an oil absorptive material sold as MyCelx®, to remove hydrocarbons from the wastewater;
  passing the wastewater through an electrocoagulation system to neutralize the charges of the suspended particles in the wastewater;
  gravity feeding the wastewater from the electrocoagulation system to at least one settling tank where the wastewater is temporarily stored;
  allowing the neutralized particles in the wastewater to separate from the wastewater and fall to the bottom of the at least one settling tank;
  passing the filtered wastewater from the at least one settling tank through at least one mechanical filter to remove suspended particles from the filtered wastewater and produce filtered water that is free from suspended particles.

7. The method of claim 6 wherein passing the filtered wastewater through at least one mechanical filter comprises:
passing the filtered wastewater through at least one mechanical filter having a pore size less than 0.5 microns.

8. The method of claim 6 further comprising:
passing the filtered water through another filter to remove dissolved particles from the filtered water and produce filtered water that is substantially free from dissolved particles.

9. The method of claim 8 wherein passing the filtered water through another filter comprises:
passing the filtered water through a reverse osmosis filter.

10. A water filtering system, comprising:
  an oil separator and at least one filter having a spunbond polypropylene, replaceable filter cartridge that is coated with an oil absorptive material sold as MyCelx®, that receives a flow of wastewater, and removes hydrocarbons from the wastewater;
  an electrocoagulation system that receives the flow of wastewater at its bottom, and neutralizes charges on particles that are suspended in the wastewater as the wastewater flows up through the electrocoagulation system and out its top;
  at least one settling tank that receives the wastewater from the electrocoagulation system, and temporarily stores the wastewater to allow the suspended particles having the neutralized charges to separate from the wastewater and fall to the bottom of the at least one settling tank, wherein the wastewater is gravity-fed from the electrocoagulation system to the at least one settling tank; and
  at least one mechanical filter that receives the filtered wastewater from the at least one settling tank, and removes suspended particles from the filtered wastewater to produce filtered water that is free from suspended particles.

11. The water filtering system of claim 10 wherein:
the at least one mechanical filter has a pore size less than 0.5 microns.

12. The water filtering system of claim 10 further comprising:
a reverse osmosis filter connected to the at least one mechanical filter that removes dissolved particles from the filtered water to produce filtered water that is substantially free from dissolved particles.

13. The water filtering system of claim 10 further comprising:
a filter press connected to the at least one settling tank;
wherein the filter press receives a slurry from the bottom of the at least one settling tank, and separates the slurry into a solid and a liquid,
wherein the liquid removed from the slurry is fed back to the electrocoagulation system.

* * * * *